United States Patent
Chung et al.

(10) Patent No.: US 10,087,282 B2
(45) Date of Patent: Oct. 2, 2018

(54) THERMALLY ADHESIVE FLEXIBLE POLYLACTIC ACID RESIN COMPOSITION

(71) Applicant: SK CHEMICALS CO., LTD., Gyeonggi-do (KR)

(72) Inventors: Jae-il Chung, Gyeonggi-do (KR); Tae-young Kim, Gyeonggi-do (KR); Sung-wan Jeon, Gyeonggi-do (KR); Min-young Kim, Seoul (KR)

(73) Assignee: SK CHEMICALS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/315,036

(22) PCT Filed: Jun. 1, 2015

(86) PCT No.: PCT/KR2015/005476
§ 371 (c)(1),
(2) Date: Nov. 30, 2016

(87) PCT Pub. No.: WO2015/186943
PCT Pub. Date: Dec. 10, 2015

(65) Prior Publication Data
US 2017/0198089 A1 Jul. 13, 2017

(30) Foreign Application Priority Data

Jun. 5, 2014 (KR) .................. 10-2014-0068620

(51) Int. Cl.
| | |
|---|---|
| *C08G 18/00* | (2006.01) |
| *C08G 63/08* | (2006.01) |
| *C08G 18/42* | (2006.01) |
| *C08G 18/83* | (2006.01) |
| *C08L 67/04* | (2006.01) |
| *C08G 18/24* | (2006.01) |
| *C08G 18/48* | (2006.01) |
| *C08G 18/73* | (2006.01) |
| *C09J 167/04* | (2006.01) |
| *C09J 7/35* | (2018.01) |

(52) U.S. Cl.
CPC ........... *C08G 63/08* (2013.01); *C08G 18/242* (2013.01); *C08G 18/428* (2013.01); *C08G 18/48* (2013.01); *C08G 18/73* (2013.01); *C08G 18/83* (2013.01); *C08L 67/04* (2013.01); *C09J 7/35* (2018.01); *C09J 167/04* (2013.01); *C08G 2170/20* (2013.01); *C08G 2230/00* (2013.01); *C08L 2201/06* (2013.01); *C08L 2203/16* (2013.01); *C09J 2205/114* (2013.01)

(58) Field of Classification Search
CPC ...... C08G 63/08; C08G 18/242; C08G 18/48; C08G 18/73; C08G 18/428
See application file for complete search history.

(56) References Cited

U.S. PATENT DOCUMENTS

| | | | | |
|---|---|---|---|---|
| 9,062,147 | B2* | 6/2015 | Sohn .................... | C08G 63/823 |
| 9,382,385 | B2* | 7/2016 | Sohn .................... | C08J 5/18 |
| 9,382,386 | B2* | 7/2016 | Sohn .................... | C08G 81/00 |
| 2011/0306719 | A1* | 12/2011 | Hilmer ................ | C08G 18/664 |
| | | | | 524/539 |
| 2012/0095169 | A1* | 4/2012 | Ogawa .................. | C08L 67/04 |
| | | | | 525/450 |
| 2014/0004330 | A1* | 1/2014 | Yoo ...................... | C08G 18/428 |
| | | | | 428/220 |
| 2014/0037931 | A1* | 2/2014 | Yoo ...................... | C08J 5/18 |
| | | | | 428/220 |
| 2014/0154489 | A1 | 6/2014 | Sohn et al. ................. | 428/220 |
| 2014/0302297 | A1* | 10/2014 | Yoo ...................... | C08J 5/18 |
| | | | | 428/220 |
| 2015/0147549 | A1* | 5/2015 | Yoo ...................... | C08G 81/00 |
| | | | | 428/220 |

FOREIGN PATENT DOCUMENTS

| | | | | |
|---|---|---|---|---|
| JP | 2005-008897 | | 1/2005 | ............. C08G 63/08 |
| JP | 2011-012281 | | 1/2011 | ............. C08L 67/04 |

(Continued)

OTHER PUBLICATIONS

"A Novel Composite Coupled Hardness with Flexibleness-Polylactic Acid Toughen with Thermoplastic Polyurethane" Hong et al. Journal of Applied Polymer Science, vol. 121, 855-861 (2011).*
"Toughening of Polylactide by Melt Blending with a Biodegradable Poly(ether)urethane Elastomer" Macromol. Biosci. 2007, 7, 921-928.*
ISR dated Jul. 14, 2015 in PCT/KR2015/005476 published in WO 2015/186943.

*Primary Examiner* — Michael L Leonard
(74) *Attorney, Agent, or Firm* — Harness, Dickey & Pierce, P.L.C.

(57) ABSTRACT

The present invention relates to a polylactic acid resin composition which has a low glass transition temperature, fusion temperature, and enthalpy of fusion, can be crystallized under commercially meaningful processing conditions, has good film processability such as extrusion properties, has excellent storage stability, and is highly biodegradable. The polylactic acid resin composition comprises a block copolymer comprising a hard segment and a soft segment, the hard segment comprising polylactic acid repeat units, and the soft segment comprising polyurethane polyol repeat units which have polyether-based polyol repeat units linearly connected via a urethane bond, wherein the soft segment is contained by 5% to 35% by weight based on the weight of the block copolymer, and the polylactic acid repeat units include poly(L-lactic acid) repeat units and poly(D-lactic acid) repeat units by a molar ratio of 94:6 to 88:12.

12 Claims, No Drawings

(56) References Cited

FOREIGN PATENT DOCUMENTS

| KR | 10-2012-0068550 | 6/2012 | ............. | C08G 63/08 |
| KR | 10-2012-0135889 | 12/2012 | ............. | C08G 63/08 |
| KR | 10-2013-0067129 | 6/2013 | ............. | C08G 63/08 |
| KR | 10-2013-0135758 | 12/2013 | ............. | C08G 63/08 |

* cited by examiner

THERMALLY ADHESIVE FLEXIBLE POLYLACTIC ACID RESIN COMPOSITION

CROSS-REFERENCE TO RELATED APPLICATIONS

This application is a national phase application of PCT Application No. PCT/KR2015/005476, filed on Jun. 1, 2015, which claims the benefit and priority of Korean Patent Application No. 10-2014-0068620, filed Jun. 5, 2014. The entire disclosures of the applications identified in this paragraph are incorporated herein by reference.

FIELD

The present invention relates to a flexible polylactic acid resin composition. Specifically, the present invention relates to a heat sealable, flexible polylactic acid resin composition, which can be crystallized under industrially feasible conditions and has a low glass transition temperature, a low melting temperature, and a low enthalpy of fusion, excellent film processability such as extrudability, improved storage stability, and good biodegradability.

BACKGROUND

Petroleum-based resins such as polyethylene terephthalate (PET), nylon, polyolefin or plasticized polyvinyl chloride (PVC) are widely used today for a variety of applications, for example, a packaging material. However, such petroleum-based resins are not biodegradable, thereby causing environmental pollutions, e.g., emission of a large amount of greenhouse gases during waste disposal processes. Recently, due to gradual depletion of petroleum resources, the use of biomass-based resins, typically polylactic acid resins, is extensively considered as an alternative.

Particularly, in recent years, there has been growing interest in food packaging films made of biodegradable, heat sealable films. For this purpose, amorphous polylactic acid resins based on optical isomers in combination of D-lactide and L-lactide monomers have been developed.

However, such amorphous polylactic acid resins to serve as a base resin for heat sealable films may suffer from poor extrudability during the formation of films caused by blocking that may occur at temperatures above their glass transition temperatures. Polylactic acid resins show low adhesiveness, when heat sealed, because of their unique low cohesive attraction. They also have issues associated with storage instability due to their limited storage conditions. Accordingly, polylactic acid resins have limited applicability due to their poor adhesiveness, processability, and storage stability, as compared with conventional linear low density polyethylene (LLDPE) resins commonly used as a heat sealable resin.

Further, polylactic acid resins do not have satisfactory mechanical properties as compared with petroleum-based resins. They also involve a problem of low flexibility when formed into films. In order to redress such problems, a number of methods have been suggested: for example, adding to a polylactic acid resin a low molecular weight softener or plasticizer, introducing a plasticizer prepared by addition polymerization of a polyether- or aliphatic polyester-based polyol, etc. Most of the packaging films prepared from polylactic acid resins by such methods, however, still have limited flexibility. Moreover, said plasticizers may bleed out over a period of time and give rise to a drawback that packaging films prepared therefrom suffer from high haze and low transparency. Thus, in recent years, it has been suggested to prepare a block copolymer by introducing a polyurethane polyol repeating unit to a polylactic acid resin (see Korean Laid-Open Patent Publication No. 2013-0135758) in order to overcome these problems.

However, there is still a demand for improving such conventional polylactic acid resins with respect to desirable characteristics for film processing such as glass transition temperature, melting temperature, crystallization properties, and the like, as well as desirable mechanical properties for heat sealable films such as thermal adhesiveness, flexibility, and mechanical strength.

SUMMARY OF THE INVENTION

Therefore, it is an object of the present invention to provide a polylactic acid resin composition, which can be crystallized under industrially feasible conditions and has a low glass transition temperature, a low melting temperature, and a low enthalpy of fusion, excellent film processability such as extrudability, improved storage stability, and good biodegradability.

In accordance with one aspect of the present invention, there is provided a polylactic acid resin composition, which comprises a polylactic acid resin comprising a hard segment comprising a polylactic acid repeating unit of Formula 1 and a soft segment comprising a polyurethane polyol repeating unit in which polyether-based polyol repeating units of Formula 2 are linearly linked via urethane bonds, wherein the polylactic acid resin comprises the hard segment in an amount of 65 to 95 wt % and the soft segment in an amount of 5 to 35 wt % based on the weight of the polylactic acid resin, wherein the polylactic acid repeating unit comprises a poly-L-lactic acid repeating unit and a poly-D-lactic acid repeating unit in a molar ratio of 94:6 to 88:12, and wherein, in Formula 1, n is an integer from 700 to 5,000; and, in Formula 2, A is a linear or branched alkylene of 2 to 5 carbon atoms, and m is an integer from 10 to 100:

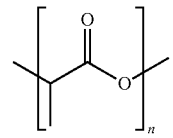

[Formula 1]

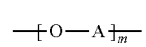

[Formula 2]

The polylactic acid resin composition according to the present invention can be crystallized under industrially feasible conditions and has a low glass transition temperature, a low melting temperature, and a low enthalpy of fusion. Also, the polylactic acid resin composition is eco-friendly owing to its good biodegradability and shows improved storage stability and excellent film processability such as extrudability. Moreover, the polylactic acid resin composition exhibits excellent thermal adhesiveness, flexibility, mechanical strength, and anti-blocking properties, when it is processed into films.

DETAILED DESCRIPTION

Hereinafter, a polylactic acid resin composition according to an embodiment of the present invention is explained in detail.

Polylactic Acid Resin Composition

The polylactic acid resin composition comprises a polylactic acid resin as a main component.

The polylactic acid resin comprises a hard segment comprising a polylactic acid repeating unit of Formula 1 and a soft segment comprising a polyurethane polyol repeating unit in which polyether-based polyol repeating units of Formula 2 are linearly linked via urethane bonds (—C(=O)—NH—), wherein, in Formula 1, n is an integer from 700 to 5,000; and, in Formula 2, A is a linear or branched alkylene of 2 to 5 carbon atoms, and m is an integer from 10 to 100:

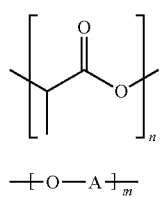

[Formula 1]

[Formula 2]

Preferably, the polylactic acid resin is a block copolymer—i.e., a polylactic acid-based copolymer resin—in which the hard segment and the soft segment are combined.

In the polylactic acid resin according to an embodiment of the present invention, the polylactic acid repeating unit of Formula 1 contained in the hard segment refers to a repeating unit in which a poly-L-lactic acid repeating unit and a poly-D-lactic acid repeating units are copolymerized in specific molar ratios.

The poly-L-lactic acid repeating unit may be derived from L-lactide or L-lactic acid, and the poly-D-lactic acid repeating unit may be derived from D-lactide or D-lactic acid.

The polylactic acid repeating unit in which the poly-L-lactic acid repeating unit and the poly-D-lactic acid repeating unit are copolymerized may be, for example, a copolymerized repeating unit having an atactic configuration lacking stereoregularity (or tacticity) or a heterotactic configuration. Thus, the hard segment may be amorphous.

In the polylactic acid repeating unit, the molar ratio of the poly-L-lactic acid repeating unit to the poly-D-lactic acid repeating unit (L:D) is 94:6 to 88:12. When the molar ratio is within this range, films prepared from the polylactic acid resin composition may have excellent adhesiveness at heat sealing temperatures of, e.g., 100° C. to 130° C. Also, when the molar ratio is within this range, such problems as clogging at the inlet of the extruder may be prevented, deviations in the thickness of a molded film may be reduced, and anti-blocking properties of the film may be improved.

It is difficult for conventional polylactic acid resins prepared by copolymerization of the stereomers (i.e., poly-L-lactic acid and poly-D-lactic acid repeating units) in above molar ratios to be crystallized due to low mobility of the polylactic acid chains. In contrast, the polylactic acid resin of the present invention, wherein (i) the hard segment and (ii) the soft segment that imparts mobility to the polylactic acid chains are block copolymerized, can readily be crystallized. Thus, the polylactic acid resin may have excellent processability and improved storage stability by preventing blocking problems at temperatures above its glass transition temperature (Tg) during extrusion or storage.

Also, films prepared from conventional polylactic acid resins show low adhesiveness upon heat sealing because of low cohesive attraction of the resins. In contrast, the polylactic acid resin of the present invention, wherein (i) the non-crystalline hard segment and (ii) the soft segment having a molecular structure that enhances cohesive attraction are block copolymerized, is useful for preparing heat sealable films owing to their crystallizability and improved adhesiveness at temperatures of 100° C. to 130° C.

Moreover, the polylactic acid resin of the present invention, which comprises a polylactic acid repeating unit as a hard segment, not only is biodegradable like biomass-based resins, but also produces films having excellent mechanical properties. At the same time, the polylactic acid resin of the present invention produces films having improved flexibility owing to its soft segment. Also, bleed-out of the soft segment may be minimized because the hard segment and the soft segment are combined to form a block copolymer. Additionally, the addition of such soft segment prevents deterioration in moisture resistance, mechanical properties, heat resistance, transparency, or haze properties of films.

The polylactic acid resin according to an embodiment of the present invention comprises the hard segment in an amount of 65 to 95 wt % and the soft segment in an amount of 5 to 35 wt %, preferably the hard segment in an amount of 80 to 95 wt % and the soft segment in an amount of 5 to 20 wt %, more preferably the hard segment in an amount of 82 to 94 wt % and the soft segment in an amount of 6 to 18 wt %, based on the weight of the polylactic acid resin. When the amount of the hard segment is within these ranges, the molecular weight characteristics of the resin may be improved (for example, higher molecular weights and narrower molecular weight distributions). Thus, films prepared from the resin may have enhanced mechanical properties in terms of film strength. At the same time, when the amount of the soft segment is within these ranges, films prepared from the resin may have good flexibility. Further, the polyurethane polyol repeating unit may effectively function as an initiator, thereby improving the molecular weight characteristics of the resin.

The polyurethane polyol repeating unit contained in the soft segment has a structure in which polyether polyol repeating units of Formula 2 are linearly linked via urethane bonds (—C(=O)—NH—). Specifically, the polyether-based polyol repeating unit may be obtained by ring-opening (co)polymerization of monomers such as an alkylene oxide. The polyether-based polyol repeating unit thus obtained has hydroxyl groups at its terminal ends. The terminal hydroxyl groups react with a diisocyanate compound to form a urethane bond (—C(=O)—NH—). Also, the polyether-based polyol repeating units are linearly linked via such urethane bonds to thereby form a polyurethane polyol repeating unit. Such polyurethane polyol repeating unit may significantly improve the flexibility of films prepared from a polylactic acid resin comprising the polyurethane polyol repeating unit as a soft segment. Also, the polyurethane polyol repeating unit may improve the general properties of films prepared from a polylactic acid resin comprising the polyurethane polyol repeating unit, without compromising heat resistance, anti-blocking property, mechanical properties, or transparency of the films.

The polylactic acid resin according to an embodiment of the present invention may significantly improve the flexibility of films prepared therefrom owing to the presence of a polylactic acid repeating unit and a polyurethane polyol repeating unit in which a plurality of polyether polyol repeating units are linearly linked via urethane bonds. Also, the polylactic acid resin can have desired molecular weight characteristics attributable to a narrow molecular weight distribution. Films prepared from the polylactic acid resin may have excellent mechanical properties, heat resistance, and anti-blocking properties owing to the presence of relatively large blocks of a polylactic acid repeating unit.

In contrast, conventional polylactic acid copolymers have such problems as reduced transparency and increased haze values of films due to low compatibility between the polyester polyol and the polylactic acid. These conventional polylactic acid copolymers also have such problems as poor extrudability as well as poor mechanical properties, heat resistance, and anti-blocking properties of films attributable to wide molecular weight distributions and poor melt characteristics of the copolymers. Such conventional polylactic acid copolymers are prepared by copolymerizing a polyether polyol repeating unit and a polylactic acid repeating unit in a branched manner with a tri- or higher functional isocyanate compound, or by copolymerizing a polyether polyol repeating unit and a polylactic acid repeating unit followed by chain extension through a urethane reaction. These conventional polylactic acid copolymers, however, contain a small block of a polylactic repeating unit serving as a hard segment; thus, they have insufficient heat resistance, mechanical properties, and anti-blocking properties of films, along with such problems as poor extrudability attributable to their wide molecular weight distributions and poor melt characteristic of the copolymers.

In order to prepare a polyurethane polyol repeating unit, a polyether-based polyol repeating unit is subjected to a reaction with a diisocyanate compound such that the molar ratio of terminal hydroxyl groups of the polyether-based polyol repeating unit to isocyanate groups of the diisocyanate compound is 1:0.50 to 1:0.99, preferably 1:0.60 to 1:0.90, more preferably 1:0.70 to 1:0.85. The polyurethane polyol repeating unit may act as an initiator for the block polymerization with a polylactic acid repeating unit since it has hydroxyl groups at its terminal ends. When the molar ratio of terminal hydroxyl groups to isocyanate groups (NCO/OH) exceeds 0.99, the number of terminal hydroxyl groups of the polyurethane polyol repeating unit becomes insufficient (for example: OHV<3) so that the polyurethane polyol repeating unit cannot suitably act as an initiator. This may hinder the production of a polylactic acid resin having excellent molecular weight characteristics and significantly reduce the polymerization yield. On the other hand, when the molar ratio of terminal hydroxyl groups to isocyanate groups (NCO/OH) is too low, the terminal hydroxyl groups of the polyurethane polyol repeating unit become too abundant (for example: OHV>21), thereby making it difficult to produce a polylactic acid resin with excellent molecular weight characteristics derived from polylactic acid repeating units of high molecular weights.

The polyether-based polyol repeating unit may be a repeating unit of polyether-based polyol (co)polymers prepared by ring-opening (co)polymerization of one or more alkylene oxide monomers. Examples of the alkylene oxide include ethylene oxide, propylene oxide, butylene oxide, tetrahydrofuran, and the like. Examples of the polyether-based polyol repeating unit include a repeating unit of polyethylene glycol (PEG); a repeating unit of poly(1,2-propylene glycol); a repeating unit of poly(1,3-propanediol); a repeating unit of polytetramethylene glycol; a repeating unit of polybutylene glycol; a repeating unit of a polyol copolymerized from propylene oxide and tetrahydrofuran; a repeating unit of a polyol copolymerized from ethylene oxide and tetrahydrofuran; a repeating unit of a polyol copolymerized from ethylene oxide and propylene oxide, and the like. For imparting flexibility to a polylactic acid resin film and in light of its affinity to a polylactic acid repeating unit and moisture-containing capability, a repeating unit of poly(1,3-propanediol) or polytetramethylene glycol is preferred as the polyether-based polyol repeating unit.

The polyether-based polyol repeating unit may have a number average molecular weight of 1,000 to 100,000, preferably 10,000 to 50,000. When the number average molecular weight of the polyether-based polyol repeating unit is too high or low, films prepared from a polylactic acid resin comprising the repeating unit may have insufficient flexibility or mechanical properties. A polylactic acid resin having molecular weight characteristics deviating from, e.g., desired number average molecular weights and molecular weight distributions may have insufficient processability or produce films with deteriorated mechanical properties.

The diisocyanate compound may be any compound that has two isocyanate groups in its molecule. Examples of the diisocyanate compounds include 1,6-hexamethylene diisocyante, 2,4-toluene diisocyanate, 2,6-toluene diisocyanate, 1,3-xylene diisocyanate, 1,4-xylene diisocyante, 1,5-naphthalene diisocyante, m-phenylene diisocyante, p-phenylene diisocyante, 3,3'-dimethyl-4,4'-diphenylmethane diisocyante, 4,4'-bisphenylene diisocyante, hexamethylene diisocyante, isophorone diisocyanate, hydrogenated diphenylmethane diisocyanate, and the like. In addition, other various diisocyanate compounds well known to those skilled in the art may be used without particular limitations. For imparting flexibility to a polylactic acid resin film, 1,6-hexamethylene diisocyanate is preferred.

The polylactic acid resin according to an embodiment of the present invention may be a block copolymer in which a polylactic acid repeating unit of hard segment is linked with a polyurethane polyol repeating unit of soft segment. The terminal carboxyl groups of the polylactic acid repeating unit are linked to the terminal hydroxyl groups of the polyurethane polyol repeating unit via ester bonds. For example, the chemical structure of the block copolymer may be represented by the following General Formula 1:

Polylactic acid repeating unit (L)-Ester-Polyurethane polyol repeating unit (E-U-E-U-E)-Ester-Polylactic acid repeating unit (L)     [General Formula 1]

wherein E is a polyether-based polyol repeating unit, U is a urethane bond, and Ester is an ester bond.

The polylactic acid resin composition of the present invention may comprise the polylactic acid resin in an amount of 1 wt % or more, specifically 30 wt % or more, 50 wt % or more, 70 wt % or more, or 90 wt % or more.

Not all of the polylactic acid repeating units contained in the polylactic acid resin composition need to be combined with the polyurethane polyol repeating units to form a block copolymer. At least some of the polylactic acid repeating units may be in the form of a polylactic acid homopolymer resin and are not combined with the polyurethane polyol repeating units. In such event, the polylactic acid resin composition may comprise a block copolymer and a polylactic acid homopolymer resin that is not combined with a polyurethane polyol repeating unit. Also, the polylactic acid homopolymer resin may comprise a poly-L-lactic acid repeating unit and a poly-D-lactic acid repeating unit in a molar ratio of 94:6 to 88:12. The polylactic acid resin composition of the present invention may comprise the polylactic acid homopolymer resin in an amount of 1 to 30 wt % based on the total weight of the polylactic acid resin composition.

The polylactic acid resin composition may further comprise a phosphorous-based stabilizer and/or an antioxidant so as to prevent the soft segment from undergoing oxidization or thermal degradation. Examples of the antioxidant include hindered phenol-based antioxidants, amine-based antioxidants, thio-based antioxidants, phosphite-based antioxidants, and the like. Suitable stabilizers and antioxidants are well known to those skilled in the art.

Aside from the stabilizer and the antioxidant described above, the polylactic acid resin composition may comprise various known additives, such as a plasticizer, a UV stabilizer, a color blocking agent, an anti-gloss agent, a deodorant, a flame retardant, an anti-weathering agent, an anti-static agent, a releasing agent, an antioxidant, an ion exchanger, a coloring pigment, and inorganic, and organic particles, as long as they have no detrimental impacts on the general properties of the polylactic acid resin composition.

Examples of the plasticizer include phthalic acid ester-based plasticizers such as diethyl phthalate, dioctyl phthalate, dicyclohexyl phthalate, and the like; aliphatic dibasic acid ester-based plasticizers such as di-1-butyl adipate, di-n-octyl adipate, di-n-butyl sebacate, di-2-ethylhexyl azelate, and the like; phosphoric acid ester-based plasticizers such as diphenyl 2-ethylhexyl phosphate, diphenyl octyl phosphate, and the like; polyhydroxy carbonic acid ester-based plasticizers such as acetyl tributyl citrate, acetyl tri-2-ethylhexyl citrate, tributyl citrate, and the like; fatty acid ester-based plasticizers such as methyl acetyl ricinoleate, amyl stearate, and the like; polyhydric alcohol ester-based plasticizers such as glycerin triacetate, and the like; and epoxy-based plasticizers such as epoxidized soybean oil, epoxidized butyl esters of linseed oil fatty acids, epoxy octyl stearate, and the like.

Examples of the coloring pigment may include inorganic pigments such as carbon black, titanium oxide, zinc oxide, iron oxide, and the like; and organic pigments such as cyanines, phosphorous, quinones, perinones, isoindolinones, and thioindigos.

Inorganic or organic particles may be used to improve the anti-blocking property of a film, examples of which may include silica, colloidal silica, alumina, alumina sol, talc, mica, calcium carbonate, polystyrene, polymethyl methacrylate, silicon, and the like.

Further, various additives applicable to polylactic acid resins or films prepared therefrom may be employed. Their kinds and purchase routes are well known to those skilled in the art.

As explained above, the polylactic acid resin composition comprises a polylactic acid resin (as a block copolymer), which is prepared by reacting a polyether polyol repeating unit and a diisocyanate compound to produce a polyurethane polyol repeating unit in which a plurality of the polyether polyol repeating units are linearly linked via urethane bonds, followed by block copolymerization of the polyurethane polyol repeating unit with a polylactic acid repeating unit. Thus, the polylactic acid resin composition, specifically the polylactic acid resin (as a block copolymer) contained therein, may have a relatively high number average molecular weight and a relatively narrow molecular weight distribution as compared with conventional polylactic acid copolymers.

The polylactic acid resin composition, specifically the polylactic acid resin (as a block copolymer) contained therein, may have a number average molecular weight (Mn) of 50,000 to 200,000, preferably 50,000 to 150,000, and a weight average molecular weight (Mw) of 100,000 to 400,000, preferably 100,000 to 320,000. When the number average molecular weight and the weight average molecular weight are within these ranges, films prepared from the resin composition may have excellent processability and mechanical properties such as film strength, etc.

The polylactic acid resin composition, specifically the polylactic acid resin (as a block copolymer) contained in the composition, may have a molecular weight distribution (Mw/Mn), defined as a ratio of weight average molecular weight (Mw) to number average molecular weight (Mn), of 1.60 to 2.30, preferably 1.80 to 2.20. When the molecular weight distribution is within these ranges, the polylactic acid resin has proper melt viscosity and characteristics for melt processing such as extrusion, resulting in excellent extrudability and processability into films. Films prepared from the resin have good mechanical properties such as film strength. If the number average molecular weight is too high or the molecular weight distribution is too narrow, the melt viscosity of the resin becomes too high at the processing temperatures for extrusion of the resin; thus, it is difficult to process the polylactic acid resin into a film. In contrast, if the number average molecular weight is too low or the molecular weight distribution is too wide, the mechanical properties of the film such as strength may be deteriorated and the melt characteristics of the resin may be poor, e.g., low melt viscosity; thus, the resin cannot be, or is poorly, processed into a film.

The polylactic acid resin composition, specifically the polylactic acid resin (as a block copolymer) contained in the composition, may have a glass transition temperature (Tg) of 30° C. to 50° C., preferably 40° C. to 50° C. When the polylactic acid resin composition has a glass transition temperature falling within these ranges, films prepared from the resin composition can have optimal flexibility and stiffness; thus, these films are useful as packaging films. If the glass transition temperature is too low, films may have improved flexibility, but they may have poor slipping property, workability, dimensional stability, or anti-blocking property attributable to significantly low stiffness. In contrast, if the glass transition temperature is too high, films may have low flexibility and high stiffness; thus, they can be easily folded and the fold marks thus formed would not readily disappear. Further, these films exhibit poor adhesion and harsh noises.

The polylactic acid resin composition, specifically the polylactic acid resin (as a block copolymer) contained in the composition, may have a melting temperature (Tm) of 100° C. to 130° C., preferably 110° C. to 120° C. When the melting temperature is within these ranges, the resin is well processed into films that have improved heat resistance.

The polylactic acid resin composition, specifically the polylactic acid resin (as a block copolymer) contained in the composition, may have an enthalpy of fusion (ΔHm) of 5 to 30 J/g, preferably 10 to 20 J/g. The enthalpy of fusion of the resin composition falling within these ranges allows stable extrusion due to crystallization of the resin and sufficient thermal adhesives of films at heat sealing temperatures (e.g., 100 to 130° C.).

Since the polylactic acid resin composition is prepared to have desirable molecular weight characteristics in terms of specific weight average molecular weight and molecular weight distribution, it is readily processed to films by melt processing such as extrusion. Further, the films thus prepared have good mechanical properties including strength.

For example, the polylactic acid resin composition containing the polylactic acid resin (as a block copolymer) may be subjected to melt processing such as extrusion at a temperature of 150° C. to 190° C. The composition may have a melt viscosity of 1,500 to 3,500 Pa·s, preferably 1,700 to 3,000 Pa·s, at this temperature range. Accordingly, the polylactic acid resin composition may be well extruded into films having excellent properties at a significantly improved productivity.

As described above, the polylactic acid resin composition of the present invention comprises a polylactic acid resin as a main component, which comprises a specific amount of optical isomers of polylactic acid repeating units and a specific amount of polyurethane polyol repeating units as a soft segment. Thus, the polylactic acid resin composition has a low glass transition temperature, a low melting temperature, and a low enthalpy of fusion, and can be crystallized under industrially feasible conditions (e.g., 3 hours or less in a crystallization chamber). Also, the polylactic acid resin composition is eco-friendly owing to its good biodegradability and shows excellent processability into films by, e.g., extrusion and improved storage stability. Moreover, films prepared from the polylactic acid resin composition can have excellent thermal adhesiveness, flexibility, mechanical properties, and anti-blocking properties.

Preparation of Polylactic Acid Resin Composition

A method of preparing the polylactic acid resin composition according to an embodiment of the present invention is explained below.

The method for preparing the polylactic acid resin composition may comprise the steps of: (a) subjecting at least one monomer such as an alkylene oxide to ring-opening (co)polymerization to obtain a (co)polymer comprising a polyether-based polyol repeating unit; (b) subjecting the (co)polymer comprising a polyether-based polyol repeating unit to a reaction with a diisocyanate compound in the presence of a catalyst to obtain a (co)polymer comprising a polyurethane polyol repeating unit; and (c) subjecting D-lactic acid and L-lactic acid to polycondensation in a specific molar ratio, or subjecting D-lactide and L-lactide to ring-opening polymerization in a specific molar ratio, in the presence of the (co)polymer comprising a polyurethane polyol repeating unit.

As monomers, L-lactic acid and D-lactic acid may be used in a molar ratio (L:D) of 94:6 to 88:12, or L-lactide and D-lactide may be used in a molar ratio (L:D) of 94:6 to 88:12. Further, 65 to 95 wt % of the polylactic acid repeating unit (i.e., hard segment) may be copolymerized with 5 to 35 wt % of the polyurethane polyol repeating unit (i.e., soft segment).

The polylactic acid resin composition may be prepared by subjecting a (co)polymer comprising a polyether-based polyol repeating unit and a diisocyanate compound to a urethane reaction in the presence of a catalyst to obtain a (co)polymer comprising a polyurethane polyol repeating unit in which the polyether-based polyol repeating units are linearly linked via urethane bonds, and then subjecting the polyurethane polyol repeating unit to copolymerization with lactic acid (D- and L-lactic acid) or lactide (D- and L-lactide) in the presence of a catalyst.

A polylactic acid resin comprising a block copolymer and having excellent physical properties may be prepared by the aforementioned method.

In this method, the polylactic acid resin may have desirable physical properties, e.g., excellent molecular weight characteristics, as described above by controlling the molar ratio of the (co)polymer comprising a polyether-based polyol repeating unit and the diisocyanate compound, the molecular weight of the polyether-based polyol (co)polymer, or the amount of the (co)polymer comprising a polyurethane polyol repeating unit, which serves as a soft segment. Suitable ranges of such molar ratio, molecular weight of the polyether-based polyol (co)polymer, and the like, are as described above.

Hereinafter, the method of preparing the polylactic acid resin composition according to an embodiment of the present invention is explained in more detail.

First, at least one monomer such as an alkylene oxide is subjected to ring-opening polymerization to obtain a (co)polymer comprising a polyether-based polyol repeating unit. This step may be carried out by conventional polymerization for preparing a polyether-based polyol (co)polymer.

Subsequently, the (co)polymer comprising a polyether-based polyol repeating unit, a diisocyanate compound, and a urethane reaction catalyst are loaded into a reactor, and subjected to a urethane reaction while they are heated and stirred. By way of this reaction, the two isocyanate groups of the diisocyanate compound and the terminal hydroxyl groups of the (co)polymer are combined to form urethane bonds. As a result, a (co)polymer comprising a polyurethane polyol repeating unit in which polyether-based polyol repeating units are linearly linked via urethane bonds is formed. The polyurethane polyol repeating unit serves as a soft segment in the polylactic acid resin. The polyurethane polyol repeating unit may be in the form of E-U-E-U-E in which the polyether-based polyol repeating units (E) are linearly linked via urethane bonds (U), with the polyether-based polyol repeating units located at both terminal ends.

The urethane reaction may be carried out in the presence of a tin catalyst, for example, stannous octoate (tin(II) 2-ethylhexanoate), dibutyltin dilaurate, dioctyltin dilaurate, etc. In addition, the urethane reaction can be conducted under typical reaction conditions for the preparation of a polyurethane resin. For example, the diisocyanate compound and the polyether-based polyol (co)polymer are subjected to a reaction at 70 to 80° C. for 1 to 5 hours in the presence of a urethane reaction catalyst under nitrogen atmosphere to yield a (co)polymer comprising a polyurethane polyol repeating unit.

Subsequently, the polylactic acid resin composition comprising a block copolymer according to one embodiment may be prepared by polycondensation of lactic acid (D- and L-lactic acid), or by ring-opening polymerization of lactide (D- and L-lactide), in the presence of the (co)polymer comprising a polyurethane polyol repeating unit.

This polymerization produces polylactic acid repeating units, while the terminal groups of at least some of the polylactic acid repeating units are bonded to the polyurethane polyol repeating units to produce a block copolymer.

As a result, a block copolymer according to an embodiment of the present invention may be prepared, which is quite different in terms of structure and molecular weight characteristics from conventional polylactic copolymers prepared from a prepolymer consisting of a polyether polyol and a polylactic acid by chain extension with a diisocyanate compound or conventional branched copolymers prepared by a reaction of such prepolymer with a tri- or higher functional isocyanate compound.

Particularly, the block copolymer according to an embodiment comprises a polylactic acid repeating unit as a relatively large block (i.e., a block having a large molecular weight), so that films made from the polylactic acid resin comprising the block copolymer may have a narrow molecular weight distribution and a proper Tg, and thus may have excellent mechanical properties and heat resistance.

Meanwhile, the ring-opening polymerization of lactide may be performed in the presence of a metal catalyst such as an alkaline earth metal, a rare earth metal, a transition metal, aluminum, germanium, tin, or antimony. Specifically, the metal catalyst may be in the form of carbonic acid salts, alkoxides, halides, oxides, or carbonates. Stannous octoate, titanium tetraisopropoxide, or aluminum triisopropoxide is preferred as the metal catalyst.

Hereinafter, the function and effects of the present invention is described more specifically by following examples. However, these examples are provided only for illustration purposes, and the scope of the invention is not limited thereto.

Definitions of Physical Properties and Measuring Methods

Physical properties stated in the following Examples are defined and measured as follows.

(1) NCO/OH: molar ratio of "isocyanate groups in a diisocyanate compound (NCO)/terminal hydroxyl groups in a polyether-based polyol repeating unit (OH)" for the reaction to form a polyurethane polyol repeating unit.

(2) OHV (KOHmg/g): measured by dissolving a polyurethane polyol repeating unit in dichloromethane, acetylating the repeating unit, hydrolyzing the acetylated repeating unit to generate acetic acid, and titrating the acetic acid with 0.1 N KOH in methanol. It indicates the number of terminal hydroxyl groups in the polyurethane polyol repeating unit.

(3) Mw, Mn and molecular weight distribution (MWD): measured by subjecting a 0.25 wt % solution of a polylactic acid resin in chloroform to gel permeation chromatography (Viscotek TDA 305, Column: Shodex LF804×2 ea.). Polystyrene was used as a standard material to determine weight average molecular weight (Mw) and number average molecular weight (Mn). A molecular weight distribution (MWD) was calculated as Mw/Mn.

(4) Tg (glass transition temperature, ° C.): measured with a differential scanning calorimeter (TA Instruments) by quenching a molten sample and then increasing the temperature of the sample at a rate of 10° C./min. Tg was determined from the median value of a tangential line on an endothermic curve and a base line.

(5) Tm (melting temperature, ° C.): measured with a differential scanning colorimeter (TA Instruments) by quenching a molten sample and then elevating the temperature of the sample at a rate of 10° C./min. Tm was determined from the maximum value of a melting endothermic peak of crystals.

(6) Content of polyurethane polyol repeating unit (wt %): the content of polyurethane polyol repeating unit in each polylactic acid resin was measured using a 600 MHz nuclear magnetic resonance (NMR) spectrometer.

(7) Enthalpy of fusion ($\Delta$Hm, J/g): measured with a differential scanning calorimeter (TA Instruments) by quenching a molten sample and then increasing the temperature of the sample at a rate of 10° C./min. The enthalpy of fusion was determined by calculating the integral under the melting endothermic peak of crystals above the baseline.

(8) Melt viscosity and extrudability: In order to prepare a bi-axially oriented film, a polylactic acid resin was extruded in a 30 mm single screw extruder equipped with a T die at 200 to 250° C. into a sheet form, which was electrostatically cast on a drum cooled at 5° C. The melt viscosity of the extrudate in the form of a sheet was measured by a rheometer (Physica, USA). Specifically, a shear force was applied by a 25 mm parallel plate type instrument at a shear rate (1/s) of 1, while the initial temperature of the extrudate was maintained, during which a complex viscosity (Pa·s) of the molten resin was measured with the rheometer.

Also, extrudability was evaluated according to the following standards.

$\Theta$: melt viscosity is good, and discharge pressure is constant $\Delta$: melt viscosity is slightly low, but discharge pressure is constant x: discharge pressure is not constant, and extrusion into a film is poor (9) Film thickness deviation (%): the thickness of a stretched film was measured by a digital thickness gauge (Mitutoyo, Japan).

(10) Initial tensile strength ($kgf/mm^2$) MD, TD: A film sample of 150 mm in length and 10 mm in width was conditioned at a temperature of 20° C. and a humidity of 65% RH for 24 hours, and a tensile strength was measured at a drawing speed of 300 mm/min with a distance of 100 mm between grips according to ASTM D638 by a universal test machine (UTM, Instron). A mean value of five measurements was indicated. MD and TD stand for machine direction and transverse direction of the film, respectively.

(11) Elongation ratio (%) MD, TD: An elongation ratio was determined at the point when a film was torn under the same condition as in the tensile strength test in (10). A mean value of five measurements was indicated. MD and TD stand for machine direction and transverse direction of the film, respectively.

(12) Young's modulus ($kgf/mm^2$) MD, TD: A same film sample as in the tensile strength test in (10) was measured for Young's modulus at a drawing speed of 300 mm/min with a distance of 100 mm between grips according to ASTM D638 by a universal test machine (UTM, Instron). A mean value of five measurements was indicated. A Young's modulus, particularly a sum of Young's modulus values measured in the machine direction and the transverse direction, represents flexibility of a film. The lower the Young's modulus value is, the higher the flexibility of a film is. MD and TD stand for machine direction and transverse direction of the film, respectively.

(13) Anti-blocking property: The antistatic surface of a film sample was superposed with the print surface of COLORIT P type (Kurz), which then stood for 24 hours at 40° C. under a pressure of 1 $kg/cm^2$. Blocking between the antistatic surface and the print surface was observed. The anti-blocking property of a film between its anti-static surface and the print surface of an in-mold transfer foil was evaluated according to the following criteria. Practical performance is guaranteed by at least o.

$\Theta$: No changes o: Slight surface change (5% or less)

x: Exfoliated by greater than 5%

(14) Thermal adhesiveness: A sample heat sealable film was subjected to thermal bonding under a pressure of 2 $kgf/cm^2$ and a bonding time of 2 seconds at a temperature of 100 to 130° C., then the bonded films were peeled at a bonding strength of (gf/15 mm). Thermal adhesiveness was evaluated according to the following standards.

$\Theta$: Properly bonded and no delamination was observed at the bonded area $\Delta$: Properly bonded but delamination was observed at the bonded area x: Not bonded Base Materials Materials used in the following Examples and Comparative Examples are as follows:

(1) Polyether-based polyol repeating unit or correspondents thereto

PPDO 2.0: poly(1,3-propanediol); number average molecular weight 2,000

PPDO 2.4: poly(1,3-propanediol); number average molecular weight 2,400
Dodecanol
(2) Diisocyanate compound—HDI: hexamethylene diisocyanate
(3) Lactide monomer—L-lactide and D-lactide: from Purac
(4) Antioxidants, etc.
  TNPP: tris(nonylphenyl) phosphite
  U626: bis(2,4-di-t-butylphenyl)pentaerythritol diphosphite
  PEPQ: (1,1'-biphenyl)-4,4'-diylbisphosphonous acid tetrakis[2,4-bis(1,1-dimethylethyl)phenyl]ester ((1,1'-biphenyl)-4,4'-diylbisphosphonous acid tetrakis [2,4-bis(1,1-dimethylethyl)phenyl] ester)
  S412: tetrakis[methane-3-(laurylthio)propionate]methane
  I-1076: octadecyl 3-(3,5-di-tert-butyl-4-hydroxyphenyl)propionate
  O3: bis[3,3-bis-(4'-hydroxy-3'-tert-butyl-phenyl)butanoic acid]glycol ester Example: Preparation of Polylactic Acid Resins A to E Reactants as shown in Table 1 below and a catalyst were loaded into an 8 L reactor equipped with a nitrogen tube, a stirrer, a catalyst inlet, an effluent condenser, and a vacuum system. Dibutyltin dilaurate was used as the catalyst in an amount of 80 ppm based on the total weight of the reactants. Under nitrogen atmosphere, a urethane reaction was carried out at 70° C. for 2 hours, and then a total of 4 kg of L-lactide and D-lactide as shown in Table 1 was introduced, followed by flushing with nitrogen five times.

Subsequently, the reaction mixture was heated to 150° C. to completely dissolve the L-lactide and D-lactide. A catalyst of tin 2-ethylhexylate diluted in 100 mL of toluene in a concentration of 100 ppm based on the total weight of the reactants was fed into the reactor. Under nitrogen pressure of 1 kg, the reaction was carried out at 185° C. for 2 hours, and then 200 ppm of phosphoric acid was added through the catalyst inlet and admixed for 15 minutes to deactivate the residual catalyst. Then, vacuum was applied to the reactor until the pressure reached 0.5 torr to remove the unreacted L- or D-lactide (about 5 wt % of the initially fed weight). The physical properties of the obtained resins were measured and shown in Table 1.

Comparative Example: Preparation of Polylactic Acid Resins F to J

The procedure of Examples for preparing polylactic acid resins A to J was repeated, except that D-lactide was not added or the amounts of reactants did not fall within the ranges specified in the present invention as shown in Table 1. The molecular weight, Tg, Tm, ΔHm, etc., of the obtained resins were measured and shown in Table 1.

Experimental Example: Preparation of Thermal Adhesive Film

At least one of the polylactic acid resins A to J was dried at 80° C. for 6 hours under a reduced pressure of 1 torr and then extruded in a 30 mm single screw extruder equipped with a T die into a sheet form under the temperature conditions shown in Table 2. The extruded sheet was electrostatically cast on a drum cooled to 5° C. to obtain an unoriented film.

The unoriented film thus obtained was stretched 3 times in the machine direction (MD) between heating roles under the drawing conditions shown in Table 2. The uni-axially oriented film was fixed with clips and then stretched 4 times in the transverse direction in a tenter frame. Subsequently, the film was fixed in the transverse direction and subjected to a heat treatment at 120° C. for 60 seconds to obtain a bi-axially oriented polylactic acid resin film. The evaluation results of the film are summarized in Tables 2 and 3.

TABLE 1

| | Resin A | Resin B | Resin C | Resin D | Resin E | Resin F | Resin G | Resin H | Resin I | Resin J |
|---|---|---|---|---|---|---|---|---|---|---|
| L-lactide (g) | 3760 | 3680 | 3600 | 3600 | 3520 | 3840 | 4000 | 3400 | 4000 | 3600 |
| D-lactide (g) | 240 | 320 | 400 | 400 | 480 | 160 | — | 600 | — | 400 |
| L-/D-lactide ratio | 94/6 | 92/8 | 90/10 | 90/10 | 88/12 | 96/4 | 100/0 | 85/15 | 100/0 | 90/10 |
| PPDO 2.4 (g) | 752.6 | 666.2 | 420.5 | 664 | 664 | — | 420.9 | 420.9 | — | — |
| PPDO 2.0 (g) | — | — | — | 243.1 | — | 418.1 | — | — | — | — |
| HDI (g) | 47.4 | 39.6 | 23.5 | 12.3 | 41.8 | 26.3 | 23.6 | 23.6 | — | — |
| Dodecanol (g) | — | — | — | — | — | — | — | — | 20 | 20 |
| NCO/OH | 0.9 | 0.85 | 0.8 | 0.6 | 0.9 | 0.75 | 0.8 | 0.8 | — | — |
| OHV(KOHmg/g) | 4 | 5 | 7 | 8 | 4 | 10 | 7 | 7 | — | — |
| Soft segment Mw (Mw$_p$) | 28k | 15K | 15k | 13k | 28k | 11K | 15k | 15k | — | — |
| Polyurethane polyol repeating unit content (wt %) | 20% | 15% | 10% | 6% | 15% | 10% | 10% | 10% | 0% | 0% |
| TNPP (g) | — | — | — | 4 | — | 5 | — | — | — | 3 |
| U626 (g) | 2 | 3 | 3 | — | — | — | — | — | 2 | — |
| PEPQ (g) | — | — | — | — | 4 | — | 3 | — | — | — |
| S412 (g) | — | — | — | — | 2 | — | — | 3 | — | — |
| I-1076 (g) | — | 1 | 1 | — | — | — | — | — | — | — |
| O3 (g) | 2 | — | — | — | — | — | — | — | — | — |
| Mn (×1,000, g/mol) | 72 | 78 | 92 | 110 | 82 | 60 | 88 | 82 | 102 | 104 |
| Mw (×1,000, g/mol) | 148 | 154 | 204 | 232 | 182 | 134 | 190 | 185 | 210 | 220 |
| MWD | 1.97 | 2.01 | 2.2 | 1.93 | 2.12 | 2.1 | 1.98 | 2.1 | 2.01 | 2.1 |
| Tg (° C.) | 40 | 39 | 42 | 50 | 38 | 44 | 43 | 42 | 60 | 60 |
| Tm (° C.) | 130 | 123 | 118 | 123 | 110 | 150 | 168 | — | 180 | — |
| ΔHm (J/g) | 16.5 | 12.8 | 11.3 | 13.2 | 10.2 | 25.2 | 42 | — | 50 | — |

TABLE 2

|  | Film A | Film B | Film C | Film D | Film E | Film F | Film G | Film H | Film I | Film J | Film K | Film L |
|---|---|---|---|---|---|---|---|---|---|---|---|---|
| Resin 1 (wt %) | A 100 | B 100 | C 100 | D 100 | E 100 | F 100 | G 100 | H 100 | J 100 | I 50 | G 50 | G 40 |
| Resin 2 (wt %) | — | — | — | — | — | — | — | — | — | J 50 | A 50 | E 60 |
| Extrusion temperature (° C.) | 190 | 190 | 180 | 180 | 180 | 200 | 210 | 200 | 200 | 200 | 190 | 190 |
| Melt viscosity (Pa · s) | 2200 | 2000 | 2300 | 2800 | 1900 | 2100 | 2300 | 2100 | 3500 | 3700 | 2000 | 1800 |
| Extrusion state | ⊖ | ⊖ | ⊖ | ⊖ | ⊖ | ⊖ | ⊖ | X | X | Δ | Δ | Δ |
| Drawing temperature (° C.) | 81 | 80 | 80 | 70 | 80 | 80 | 80 | 80 | 80 | 80 | 80 | 80 |
| Drawing time (sec) | 20 | 20 | 20 | 30 | 20 | 20 | 20 | 20 | 20 | 20 | 20 | 20 |
| Drawing ratio | 3 × 4 | 3 × 4 | 3 × 4 | 3 × 4 | 3 × 4 | 3 × 4 | 3 × 4 | 3 × 4 | 3 × 4 | 3 × 4 | 3 × 4 | 3 × 4 |
| Film thickness (μm) | 20 | 20 | 20 | 21 | 20 | 20 | 20 | 20 | 20 | 20 | 25 | 20 |
| Thickness deviation (%) | ±3 | ±4 | ±3 | ±4 | ±2 | ±3 | ±3 | ±12 | ±13 | ±7 | ±7 | ±10 |
| Initial tensile strength (kgf/mm$^2$) MD | 10 | 8 | 10 | 17 | 9 | 11 | 10 | 11 | 21 | 22 | 11 | 10 |
| Initial tensile strength (kgf/mm$^2$) TD | 13 | 10 | 12 | 22 | 11 | 13 | 13 | 14 | 26 | 26 | 13 | 12 |
| Sum of tensile strength (kgf/mm$^2$) | 23 | 18 | 22 | 39 | 20 | 24 | 23 | 25 | 47 | 48 | 24 | 22 |
| Elongation rate (%) MD | 117 | 160 | 115 | 100 | 165 | 115 | 117 | 112 | 72 | 80 | 110 | 140 |
| Elongation rate (%) TD | 70 | 100 | 75 | 84 | 105 | 74 | 70 | 73 | 50 | 60 | 89 | 105 |
| Young's Modulus (kgf/mm$^2$) MD | 200 | 210 | 270 | 305 | 220 | 270 | 260 | 179 | 390 | 410 | 270 | 240 |
| Young's Modulus (kgf/mm$^2$) TD | 210 | 240 | 300 | 330 | 240 | 290 | 290 | 241 | 460 | 470 | 300 | 280 |
| Sum of Young's Modulus (kgf/mm$^2$) | 410 | 450 | 570 | 635 | 460 | 560 | 550 | 420 | 850 | 880 | 570 | 520 |
| Anti-blocking | ⊖ | ⊖ | ⊖ | ⊖ | ⊖ | ⊖ | ⊖ | X | X | ○ | ○ | ○ |

TABLE 3

|  |  | Film A | Film B | Film C | Film D | Film E | Film F | Film G | Film H | Film I | Film J | Film K | Film L |
|---|---|---|---|---|---|---|---|---|---|---|---|---|---|
| Thermal bonding property | 100° C. | Δ | Δ | Δ | Δ | ⊖ | X | X | ⊖ | ⊖ | X | X | X |
|  | 110° C. | Δ | ⊖ | ⊖ | ⊖ | ⊖ | X | X | ⊖ | ⊖ | X | X | X |
|  | 120° C. | ⊖ | ⊖ | ⊖ | ⊖ | ⊖ | X | X | ⊖ | ⊖ | X | X | X |
|  | 130° C. | ⊖ | ⊖ | ⊖ | ⊖ | ⊖ | ⊖ | X | ⊖ | ⊖ | X | X | ⊖ |
| Thermal bonding strength (@ 130° C. (gf/15 mm) |  | 1680 | 1920 | 1800 | 1570 | 2040 | 440 | — | 1620 | 1020 | — | — | 820 |

As shown in Table 1 above, Resins A to E prepared in accordance with the present invention (L-/D-lactide=94/6 to 88/12, soft segment content (polyurethane polyol repeating unit)=5 to 35 wt %) had a Tg of 50° C. or less, a Tm of 130° C. or less, an enthalpy of fusion (ΔHm) of 20 J/g or less, showing excellent molecular weight characteristics as well. As shown in Table 2 above, Resins A to E exhibited uniform extrudability without any clogging at the inlet during extrusion, which indicates that these resins can be crystallized under industrially feasible conditions.

In contrast, as shown in Table 1 above, Resins F to J falling outside the scope of the present invention had a Tm of 130° C. or more, an enthalpy of fusion (ΔHm) of 20 J/g or more, resulting in poor extrudability, as shown in Table 2, due to clogging at the inlet during extrusion.

As shown in Table 2, Films A to E prepared in accordance with the present invention had a tolerable thickness deviation of about ±5%, excellent anti-blocking properties, as well as good general film properties such as tensile strength, elongation, Young's modulus, and the like. As shown in Table 3, these films showed excellent thermal adhesiveness in the temperature range of 100 to 130° C.

However, Films F and G prepared from Resins F and G falling outside the scope of the present invention had very poor thermal adhesiveness. Films H and I prepared from Resins H and J had a poor thickness deviation and anti-blocking properties. Further, Film J, in which Resins I and J were employed, showed poor thermal adhesiveness. Films K and L, in which an excessive amount of a resin falling outside the scope of the present invention (Resin G) was blended, had poor thermal adhesiveness even though they contained resins falling within the scope of the present invention (Resin A or E).

What is claimed is:

1. A polylactic acid resin composition comprising:
   a polylactic acid resin comprising a hard segment comprising a polylactic acid repeating unit of Formula 1 and a soft segment comprising a polyurethane polyol repeating unit in which polyether-based polyol repeating units of Formula 2 are linearly linked via urethane bonds, wherein the polylactic acid resin comprises the hard segment in an amount of 65 to 95 wt % and the soft segment in an amount of 5 to 35 wt % based on the weight of the polylactic acid resin, wherein the polylactic acid repeating unit comprises a poly-L-lactic acid repeating unit and a poly-D-lactic acid repeating unit in a molar ratio of 94:6 to 88:12; and wherein, in Formula 1, n is an integer from 700 to 5,000; and, in Formula 2, A is a linear or branched alkylene of 2 to 5 carbon atoms, and m is an integer from 10 to 100:

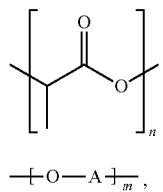

[Formula 1]

[Formula 2]

wherein the polylactic acid resin has a glass transition temperature (Tg) of 30° C. to 50° C. and a melting temperature (Tm) of 100° C. to 130° C.

2. The polylactic acid resin composition of claim 1, wherein the polylactic acid resin comprises the hard segment in an amount of 80 to 95 wt % and the soft segment in an amount of 5 to 20 wt %.

3. The polylactic acid resin composition of claim 1, wherein the poly-L-lactic acid repeating unit and the poly-D-lactic acid repeating unit are derived from L-lactide and D-lactide, respectively.

4. The polylactic acid resin composition of claim 1, wherein the urethane bonds are formed by a reaction of the terminal hydroxyl groups of the polyether-based polyol repeating unit and the isocyanate groups of a diisocyanate compound.

5. The polylactic acid resin composition of claim 4, wherein the molar ratio of the terminal hydroxyl groups of the polyether-based polyol repeating unit to the isocyanate groups of the diisocyanate compound is 1:0.50 to 1:0.99.

6. The polylactic acid resin composition of claim 1, wherein the polyether-based polyol repeating unit has a number average molecular weight of 1,000 to 100,000.

7. The polylactic acid resin composition of claim 1, wherein the polylactic acid resin is a block copolymer in which the hard segment and the soft segment are combined.

8. The polylactic acid resin composition of claim 7, wherein the terminal carboxyl groups of the polylactic acid repeating unit contained in the hard segment are combined with the terminal hydroxyl groups of the polyurethane polyol repeating unit via ester bonds to form the block copolymer.

9. The polylactic acid resin composition of claim 1, wherein the polylactic acid resin composition comprises polylactic acid repeating units, which are not combined with the polyurethane polyol repeating unit, in an amount of 1 to 30 wt %.

10. The polylactic acid resin composition of claim 1, wherein the polylactic acid resin has a number average molecular weight of 50,000 to 200,000, and a weight average molecular weight of 100,000 to 400,000.

11. The polylactic acid resin composition of claim 1, wherein the Tg of the polylactic acid resin composition of 40° C. to 50° C.

12. The polylactic acid resin composition of claim 1, having an enthalpy of fusion (ΔHm) of 10 to 20 J/g.

* * * * *